Oct. 7, 1952          F. P. REYNOLDS          2,612,914
SAFETY DEVICE FOR WOODWORKING MACHINES
Filed Oct. 4, 1949
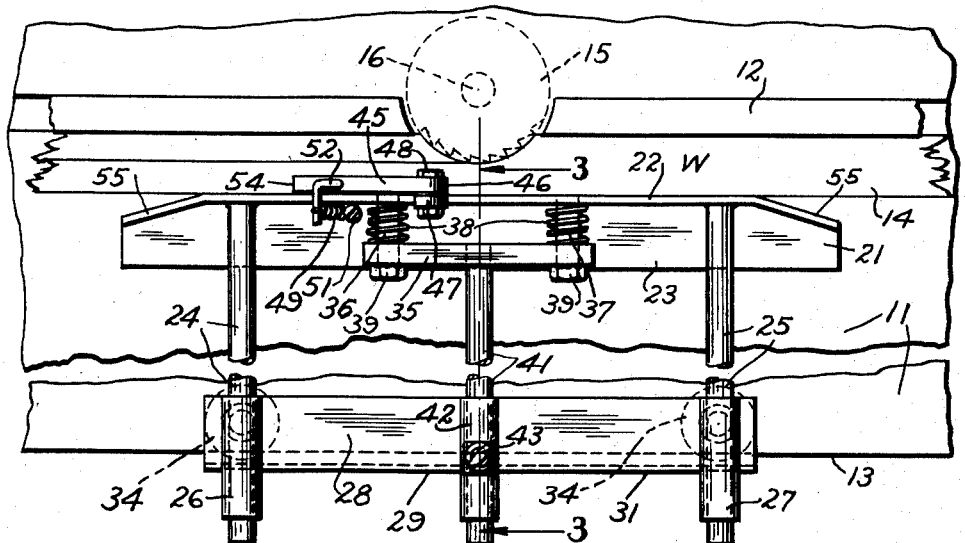
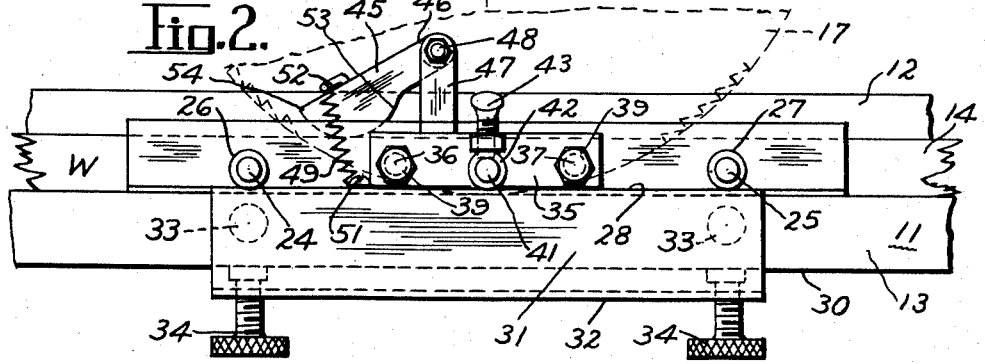
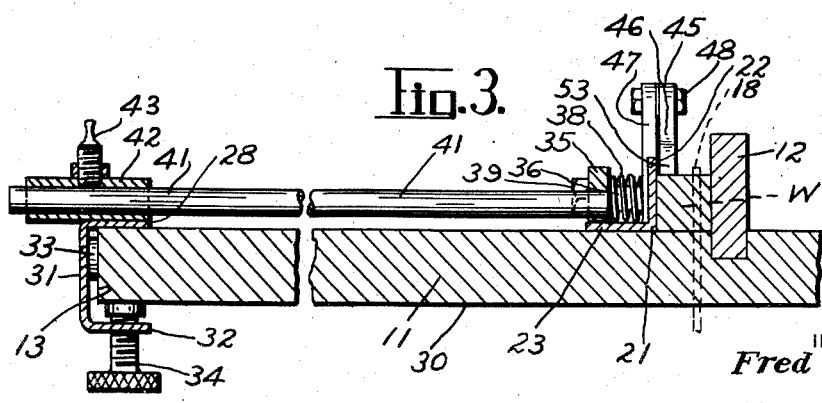
INVENTOR
Fred P. Reynolds.
BY
Walter S. Edwards
ATTORNEY Patented Oct. 7, 1952

2,612,914

UNITED STATES PATENT OFFICE 2,612,914

SAFETY DEVICE FOR WOODWORKING MACHINES

Fred P. Reynolds, Hamden, Conn., assignor to Gesner Machine Company, Hamden, Conn., a corporation of Connecticut Application October 4, 1949, Serial No. 119,421

4 Claims. (Cl. 143—174)

1

This invention relates to safety devices for wood working machines and more particularly to work engaging means for use particularly with power driven circular saws and rotary shaping cutters, whereby the work will be firmly held against a guiding fence to insure proper feeding of the work toward the cutter, and to firmly press it downwardly upon the work table, and including means to prevent it being moved opposite to its feeding movement and possibly injuring the operator of the machine.

While using circular ripping saws, or rotary shaping cutters, the work is pushed by hand toward and against the saw, or cutter, which is rotating in a direction which tends to force the work backwardly toward the operator. The work is usually guided, on the cutter side when a rotary shaping cutter is used, by a fence, which is adjustable for thickness of the desired strip, in the case of a circular saw, and for depth of cut, in the case of a shaping cutter. In addition to tending to move the work toward the operator such cutters tend to raise the work upwardly away from the work table upon which the work rests and is moved. An operator thus has to simultaneously constantly push the work against the cutter, hold the moving work against the fence, and hold the moving work downwardly upon the table to insure accurate results.

It is an object of this invention to provide a device by the use of which the operator will be relieved of the necessity of holding the moving work, particularly narrow work, against the fence and downwardly upon the table and to insure that the work will not be forced backwardly toward the operator.

Another object is to provide in a device of the above nature means to adjust the device to compensate for different widths of work.

Still another object is to provide in a device of the above nature means to vary the pressure upon the work toward the fence.

A further object is to provide in a device of the above nature, means to hold the work downwardly upon the work table and which includes means to prevent the work being forced by the cutter backwardly toward the operator.

A still further object is to provide a safety device for wood working machines which will be relatively inexpensive to manufacture, simple in construction, of a minimum number of parts, compact, convenient to use, and very efficient and durable in use.

With the above and other objects in view, which will appear as the description proceeds,

2 there has been illustrated in the accompanying drawings, one form of device in which the features and principles of this invention may be conveniently and practically embodied.

In the drawings:

Figure 1 is a top plan view of a device embodying the features and principles of this invention, shown in operative association with a rotary shaping cutter;

Figure 2 is a front elevational view of the device shown in Figure 1, shown in operative association with a circular rip saw of the overslung type; and Figure 3 is a cross-sectional view of the device taken on the line 3—3 of Figure 1, and showing the device in operative association with an underslung rip saw.

It will be understood that no changes, nor modifications, are required in the device shown in the drawings to adapt it for use with the three adaptations illustrated, they being shown merely to show the adaptability of the device and not as modifications thereof.

Referring now to the drawings wherein like reference numerals designate like parts throughout the several views, the reference numeral 11 denotes the flat horizontal work supporting table top of a wood working machine having a work guiding fence 12. The table top 11 has a front edge 13 which is parallel to the fence 12. Work W, such as a relatively narrow strip of wood 14 is guided by the fence 12 while being moved cross-wise of the table top 11 toward and past a cutter 15, which cutter is illustrated in dotted lines in Figure 1 as being in the form of a shaping cutter mounted to rotate upon a power driven vertically disposed shaft 16 to rotate therewith. The cutter 17 illustrated in dotted lines in Figure 2 is in the form of a circular rip saw mounted to rotate on a horizontal shaft disposed above the table top 11 and the cutter 18 illustrated in Figure 3 is in the form of a circular rip saw mounted to rotate on a horizontal shaft disposed below the table top 11.

The safety device of this invention includes a work engaging and guiding bar 21 which is formed from a strip of angle bar having a vertically disposed flange 22 and a horizontally disposed base flange 23. The bar 21 is disposed upon the table top 11 with its vertical flange 22 parallel to the fence 12 and with its horizontal flange 23 seated upon the upper surface of the table top 11. The bar 21 is retained in such position by rods 24 and 25, one end of each being secured, as by welding, to the flange 22 from which they extend forwardly toward the table front edge 13. The rod 24 is secured adjacent one end of the bar flange 22 and the rod 25 is secured adjacent the other end of the bar flange 22.

The forward ends of the rods 24 and 25 are extended through elongated sleeves 26 and 27 respectively and are slidable therein. The sleeves are secured, as by welding to one leg portion 28 of a U-shaped, or channel, member 29, which leg portion 28 rests upon the table top 11 at the front edge 13 of the table. The base portion 31 of the member 29 extends along and in front of the table edge 13 and its other leg portion 32 extends rearwardly under the table top 11. The base portion 31 is spaced outwardly from the front surface of the table front edge 13 by spacing pads 33 one being disposed directly under each of the sleeves 26 and 27. A clamp screw 34 is screw threaded through the leg portion 32, which is spaced downwardly from the undersurface 30 of the table top 13, directly under each sleeve 26 and 27 and is operable to firmly clamp the member to the table top 11 and thus hold the bar 21 against the table top 13, the bar 21 being adapted to be positioned against the side of the work W to hold the latter against the fence 12.

To compensate for possible unevennesses on the surface of the work W engaged by the bar flange 22, and to avoid binding of the work between the bar flange 22 and the fence 12, a plate 35 is provided which is disposed intermediate the rods 24 and 25 and slidingly rides on studs 36 and 37. The studs 36 and 37 are secured, as by welding, to the bar flange 22 and extend forwardly therefrom through the plate 35, one at each end thereof. A coiled spring 38 encircles each of the studs 36 and 37 and reacts between the plate 35 and the bar flange 22 to constantly urge them apart. A nut 39 threaded on the outer end of each stud retains the plate thereon and permits adjustment of the bar 21 to vary the compression of the springs 38. A rod 41 having one end secured, as by welding, to the plate 35 intermediate the studs 36 and 37 extends from the plate 35 forwardly and passes through a sleeve 42 secured, as by welding to the U-shaped member leg portion 28. A clamp screw 43 screwed through the sleeve 42 engages the rod 41 to clamp it thereto in any adjusted position therein when the desired spring tension of the springs 38 is obtained by pressing the plate 35 toward the bar flange 22 to adjust the pressure of the latter upon the side of the work W to firmly press the other side of the work against the fence 13, and against the cutter when the shaping cutter 15 is used.

The device of this invention also includes a work-engaging and hold down arm 45 having an end 46 pivotally secured to the upper end of a vertical strip 47 by a pivot screw 48. The strip 47 is secured, as by welding, to the bar flange 22 and extends vertically therefrom. The arm 45 extends from its pivot point toward the left of the plate 35 and in back of the bar flange 22, between it and the fence 12, swinging close to the rear face of the bar flange 22. A spring 49 secured at one end to the bar base flange 23 by a screw 51 and having its other end secured to the arm 45, by means of a finger 52, constantly urges the arm downwardly into firm engagement with the top of the work W disposed between the bar flange 22 and the fence 12 to hold such work down upon the table top 11. The free under edge 53 of the arm 45 adjacent its free end 54 is arcuate and is so positioned in respect to the lever pivot point that this arcuate edge 53 will increasingly grippingly engage the work W, should the latter tend to move toward the operator, due to any binding, or like action, of the cutter in the work, to hold it against such movement.

The safety device of this invention and as described above is particularly useful when cutting narrow strips from, or when shaping, or forming the edges of, relatively narrow stock. To assist in feeding such stock between the bar flange 22 and the fence 12 the ends 55 of the flange 22 are inclined forwardly away from the fence 12 as shown in Figure 1. The work engaging bar 21 may be readily positioned for any width of stock and will maintain the same in correct engagement with the fence 12 as it is passed by the cutter thus greatly assisting the operator and insuring safer working conditions during the operation of such machines as those above referred to.

While there has been shown and described herein a device in which the features and principles of this invention may be embodied, it is to be understood that the same may be embodied in other specific forms without departing from the spirit and essential attributes thereof, and it is therefore desired that the present embodiment be considered in all respects as illustrative, and not restrictive, reference being had to the claims rather than to the foregoing description to indicate the scope of the invention.

Having thus fully disclosed the invention, what is claimed as new and for which it is desired to secure Letters Patent, is:

1. A safety device for a wood working machine including a work supporting table having an upper surface and a front edge, a work guiding fence substantially parallel with the table front edge and at right angles to the upper surface of said table, and a cutter to operate on work moved along said fence, said device comprising a bar, slidable on said table, disposed alongside of, and in front of, said fence and being spaced therefrom to engage work disposed between said bar and said fence as the work is moved along said fence past said cutter, a rod secured to, and extending forwardly from, each end of said bar, a member extending along the front edge of said table, means to clamp said member to the front edge of said table, sleeves attached to said member to slidingly receive and guide said rods when the bar is adjusted toward and away from said fence to compensate for different widths of work, a plate disposed between said rods in front of, and closely adjacent to, said bar and connected to said member, a coiled spring between said plate and said bar, said spring being compressed to constantly urge said plate and said bar apart, means carried by said bar to limit the amount of separation of said plate and said bar by said spring, and means engaging said plate to adjust said bar laterally of the plate to vary the compression of said spring.

2. A safety device for a wood working machine including a work supporting table having an upper surface and a front edge, a work guiding fence substantially parallel with the table front edge and at right angles to the upper surface of said table, and a cutter to operate on work moved along said fence, said device comprising a bar, slidable on said table, disposed alongside of, and in front of, said fence and being spaced therefrom to engage work disposed between said bar and said fence as the work is moved along said fence past said cutter, a rod secured to, and extending forwardly from, each end of said bar, a member extending along the front edge of said table, means to clamp said member to the front edge of said table, sleeves attached to said member to slidingly receive and guide said rods when the bar is adjusted toward and away from said fence to compensate for different widths of work, a plate disposed between said rods in front of, and closely adjacent to said bar, a coiled spring between said plate and said bar, said spring being compressed to constantly urge said plate and said bar apart, means carried by said bar to limit the amount of separation of said plate and said bar by said spring, an adjusting rod secured to, and extending forwardly from said plate, a sleeve on said member to receive the last mentioned rod, and means to clamp said last mentioned rod to said sleeve in adjusted position.

3. In a safety device for a wood working machine which latter includes a work supporting table having an upper surface and a front edge, a work guiding fence substantially parallel with the table front edge and at right angles to the table upper surface, and a cutter to operate on work moved along the table and guided by said fence, a bar slidable on said table toward and away from said fence to permit work to be disposed therebetween, an elongated channel shaped member embracing the front edge of said table with one leg of said member resting on the table upper surface, a clamp screwed through the other leg of said member to engage the undersurface of the table to secure the member thereto, a sleeve secured to and disposed adjacent each end of said member, a rod extending forwardly at each end of said bar and in fixed relation thereto, said rods overlying said table upper surface and being slidingly received one in each sleeve, a third sleeve secured to and disposed intermediate the ends of said member, an adjusting rod having one of its ends slidingly received in said third sleeve, a plate in fixed relation to the other end of said adjusting rod, a compression spring disposed between each end of said plate and said bar, a threaded stud in fixed relation to said bar and extending through each spring and each end of said plate, an adjusting nut threaded on the end of each stud outside of said plate to adjust said bar laterally of said plate to vary the compression of said springs, and means to clamp said adjusting rod to said third sleeve in adjusted position.

4. In a safety device for a wood working machine which latter includes a work supporting table having an upper surface and a front edge, a work guiding fence substantially parallel with the table front edge and at right angles to the table upper surface, and a cutter to operate on work moved along the table and guided by said fence, a bar slidable on said table toward and away from said fence to permit work to be disposed therebetween, an elongated channel shaped member embracing the front edge of said table with one leg of said member resting on the table upper surface, a clamp screwed through the other leg of said member to engage the undersurface of the table to secure the member thereto, a sleeve secured to and disposed adjacent each end of said member, a rod extending forwardly at each end of said bar and in fixed relation thereto, said rods overlying said table upper surface and being slidingly received one in each sleeve, a third sleeve secured to and disposed intermediate the ends of said member, an adjusting rod having one of its ends slidingly received in said third sleeve, a plate in fixed relation to the other end of said adjusting rod, a compression spring disposed between each end of said plate and said bar, a threaded stud extending from said bar and through each spring and each end of said plate, an adjusting nut threaded on the end of each stud outside of said plate to adjust the bar laterally of said plate to vary the compression of said springs, and means to clamp said adjusting rod to said third sleeve, a strip secured to and extending vertically from said bar, an arm pivoted to the upper end of said strip, and a spring reacting between said bar and the lower end of said arm to urge it downwardly, the lower end of said arm being cam shaped to engage work between said bar and said fence and prevent kick-back of said work.

FRED P. REYNOLDS.

REFERENCES CITED

The following references are of record in the file of this patent:

UNITED STATES PATENTS

| Number | Name | Date |
|---|---|---|
| 172,279 | Sawyer | Jan. 18, 1876 |
| 202,668 | Schleicher | Apr. 23, 1878 |
| 481,983 | Thorn | Sept. 6, 1892 |
| 562,330 | Holmes | June 16, 1896 |
| 1,535,596 | French | Apr. 28, 1925 |
| 1,600,604 | Sorlien | Sept. 21, 1926 |

FOREIGN PATENTS

| Number | Country | Date |
|---|---|---|
| 599,421 | France | Oct. 19, 1925 |